United States Patent
Di Ponio

(10) Patent No.: US 6,357,557 B1
(45) Date of Patent: Mar. 19, 2002

(54) VEHICLE WHEEL HUB AND BRAKE ROTOR AND METHOD FOR PRODUCING SAME

(75) Inventor: Victor M. Di Ponio, Novi, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/742,559

(22) Filed: Dec. 20, 2000

(51) Int. Cl.[7] ................................................ F16D 65/12
(52) U.S. Cl. .............................. 188/18 A; 188/218 XL; 164/111; 301/6.8
(58) Field of Search ..................... 188/218 XL, 18 A, 188/73.2, 251 A; 301/6.1, 6.8; 29/527.7, 527.5, 530; 384/448; 192/107 R; 164/98, 111, 112

(56) References Cited

U.S. PATENT DOCUMENTS

| | | | |
|---|---|---|---|
| 2,412,432 A | * 12/1946 | Tack | |
| 2,603,316 A | * 7/1952 | Pierce | 188/218 XL |
| 4,819,769 A | * 4/1989 | Metzler | 188/218 XL |
| 4,880,281 A | 11/1989 | Merkelbach | |
| 5,107,966 A | * 4/1992 | Metzler et al. | 188/218 XL |
| 5,109,960 A | * 5/1992 | Günther | 188/218 XL |
| 5,988,324 A | 11/1999 | Bertetti | |
| 6,073,735 A | * 6/2000 | Botsch et al. | 188/218 XL |
| 6,139,215 A | * 10/2000 | Kühne et al. | 188/18 A |
| 6,152,270 A | * 11/2000 | Giorgetti | 188/218 XL |

FOREIGN PATENT DOCUMENTS

| | | | |
|---|---|---|---|
| DE | 2263643 | * | 7/1974 |
| DE | 2728335 | * | 1/1978 |
| DE | 19931140 | | 2/2000 |
| EP | 989321 | | 3/2000 |
| GB | 2107012 | * | 4/1983 |
| WO | 9825045 | * | 6/1998 |
| WO | 9928641 | * | 6/1999 |

* cited by examiner

Primary Examiner—Douglas C. Butler
(74) Attorney, Agent, or Firm—MacMillan, Sobanski & Todd, LLC

(57) ABSTRACT

This invention relates to a vehicle wheel hub and brake rotor including a wheel hub portion formed from a first material and a brake rotor portion formed from a second material and joined to the wheel hub flange during an in situ casting process. The method for producing the vehicle wheel hub and brake rotor of the present invention includes the steps of (a) providing wheel hub portion formed from a first material and including a radially outwardly extending wheel hub flange; (b) placing the wheel hub portion in a mold; and (c) casting a brake rotor portion formed from a second material in situ therewith, the brake rotor portion including a flange which is operatively joined to the wheel hub flange during the in situ casting process to thereby join the wheel hub portion to the brake rotor portion.

18 Claims, 4 Drawing Sheets

VEHICLE WHEEL HUB AND BRAKE ROTOR AND METHOD FOR PRODUCING SAME

BACKGROUND OF THE INVENTION

This invention relates in general to vehicle wheel hubs and vehicle brake rotors and in particular to an improved structure for such a vehicle wheel hub and brake rotor and method for producing the same.

It is known to cast a rotatable brake component (e.g., a rotor or drum) with an integral hub portion. A conventional integral hub and rotor includes an axially extending hub, a radially extending mounting surface, and a radially extending outer disc which can be integrally cast of the same material as one-piece during a casting operation. The hub includes a centrally located bore formed therein, and a plurality of equally spaced lug bolt receiving holes are formed in the mounting surface circumferentially about the bore. The outer disc defines a pair of brake friction plates having opposed braking surfaces which are typically machined to be parallel to one another and perpendicular to the rotor axis. The integral hub and rotor defines an inner bearing seat for receiving a bearing unit, such as for example, a preassembled cartridge type of bearing unit. The cartridge bearing unit can either be a pregreased sealed-for-life cartridge bearing, or of the type having a pair of bearing elements, either ball bearings or tapered roller bearings, disposed between an inner bearing race or cup and an outer bearing race or cup.

U.S. Pat. No. 5,988,324 to Bertetti et al. discloses a wheel hub bearing unit of a two-piece design. As disclosed the Bertetti et al. patent, the wheel hub bearing unit includes a bearing flange member which is secured to a flange of a disc or drum member by a suitable cold forming process (e.g., punching, pinching, rolling).

SUMMARY OF THE INVENTION

This invention relates to a vehicle wheel hub and brake rotor including a wheel hub portion formed from a first material and a brake rotor portion formed from a second material and joined to the wheel hub flange during an in situ casting process. The method for producing the vehicle wheel hub and brake rotor of the present invention includes the steps of (a) providing wheel hub portion formed from a first material and including a radially outwardly extending wheel hub flange; (b) placing the wheel hub portion in a mold; and (c) casting a brake rotor portion formed from a second material in situ therewith, the brake rotor portion including a flange which is operatively joined to the wheel hub flange during the in situ casting process to thereby join the wheel hub portion to the brake rotor portion.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
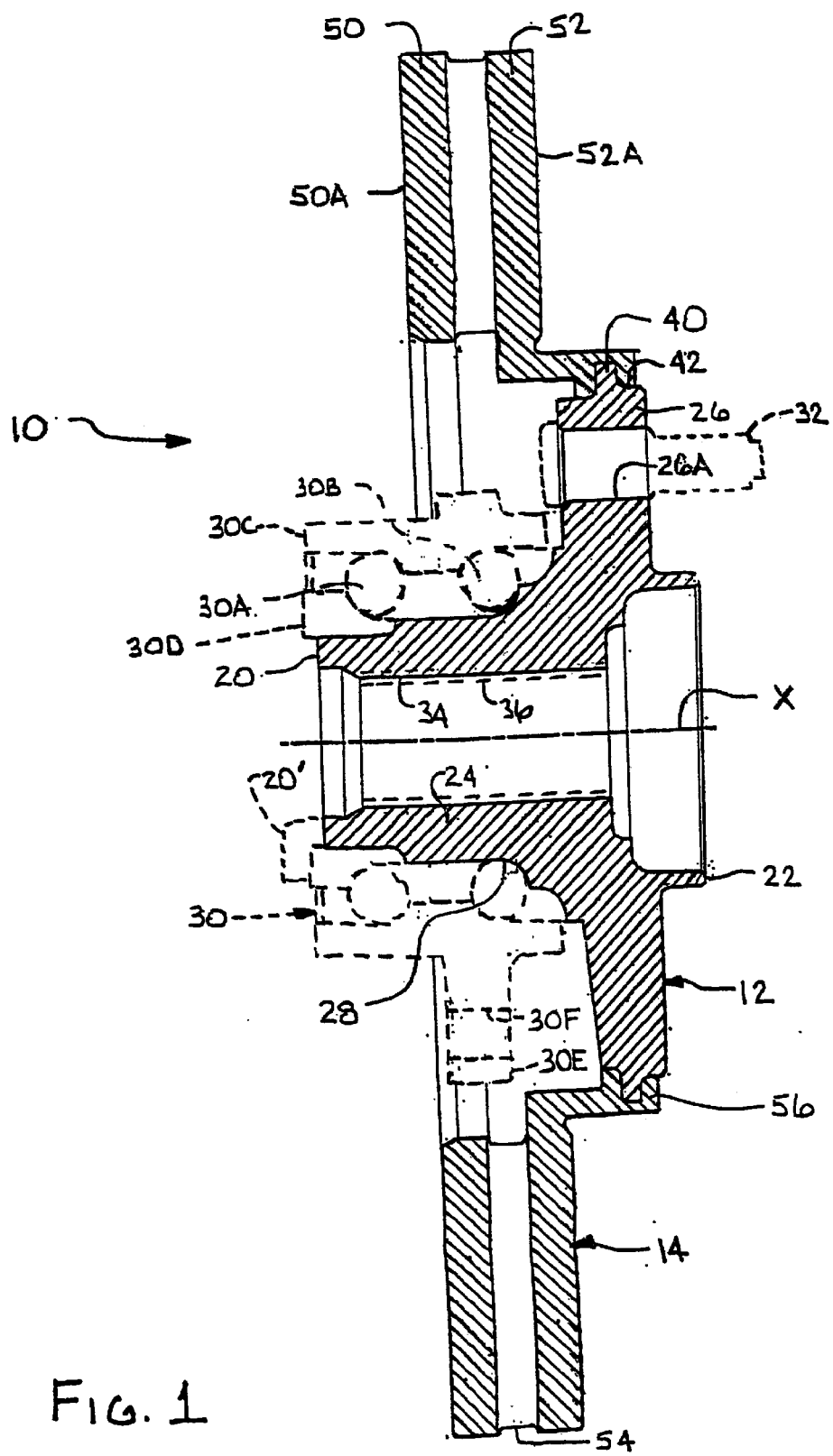
FIG. 1 is a sectional view of a first embodiment of a vehicle wheel hub and brake rotor in accordance with the present invention.

Referring now to FIG. 1, there is illustrated a first embodiment of a vehicle wheel hub and brake rotor, indicated generally at 10, in accordance with this invention. The illustrated vehicle wheel hub and brake rotor 10 is associated with a driven wheel (not shown) of a vehicle. The illustrated vehicle wheel hub and brake disc 10 is designed to work with an "internal ring rotation" type of bearing unit. The term "internal ring rotation" as used herein means that the bearing unit inner race is used to rotatably support the associated vehicle wheel hub and the bearing unit outer race is fixed (i.e., does not rotate) during vehicle operation. Although this invention will be described and illustrated in conjunction with the particular vehicle wheel hub and brake rotor 10 disclosed herein, it will be appreciated that this invention may be used in conjunction with other vehicle wheel hub and brake rotor structures. For example, the vehicle wheel hub and brake rotor 10 of this invention can be used in a non-driven wheel application and in conjunction with a driven/non-driven outer ring rotation type of bearing unit.

The vehicle wheel hub and brake rotor 10 includes a wheel hub portion 12 and a brake rotor portion 14 which are joined together in a manner to be discussed below in accordance with the present invention. The vehicle wheel hub and brake rotor 10 defines a longitudinal axis X.

The wheel hub portion 12 is preferably formed from steel, forged or cast, and includes a generally stepped body having an opened inboard end 20, an opened outboard end 22, and a generally axially extending main body 24. The main body 24 of the wheel hub portion 12 is provided with a radially outwardly extending flange 26 and defines an inner race having an outer surface 28. The outer surface 28 of the inner race of the wheel hub portion 12 defines a bearing seat for receiving a bearing unit 30 (the bearing unit 30 shown in phantom in FIG. 1). Alternatively, the wheel hub portion 12 can be formed from other materials, such as for example, ductile iron.

Figure 4:
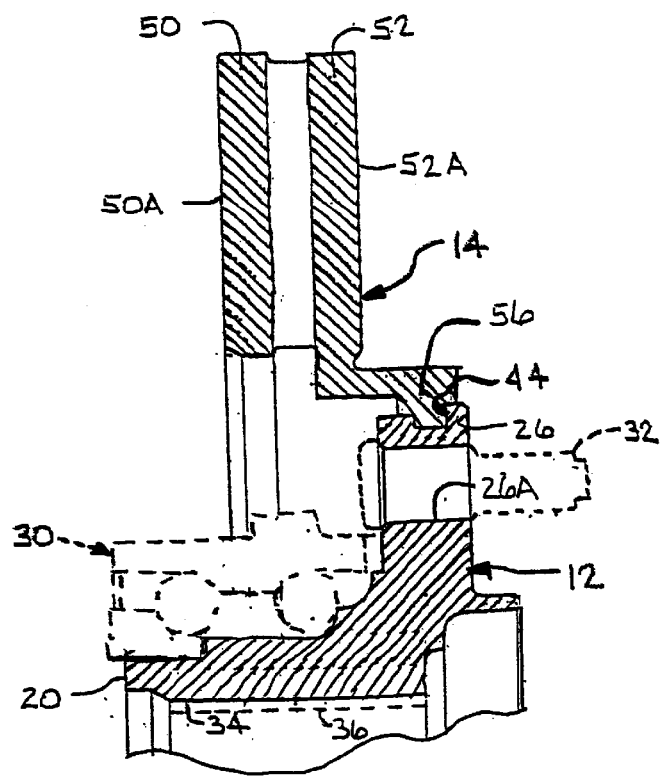
FIG. 4 is a sectional view of a portion of a second embodiment of a vehicle wheel hub and brake rotor in accordance with the present invention.

In the illustrated embodiment, the bearing unit 30 includes two rows of ball bearings 30A and 30B, an outer race 30C, and a pressed-on inner race 30D for supporting the inboard row of ball bearings 30A. The outer race 30C includes a radially outwardly extending flange 30E which is provided with a plurality of circumferentially spaced mounting bolt holes 30F formed therein (only one of such mounting bolt receiving holes 30F is illustrated in FIG. 4). A mounting bolt (not shown) is disposed in each of the mounting bolt receiving holes 30F to secure the outer race 30C of the bearing unit 54 to a non-rotatable component of the vehicle, such as the steering knuckle (not shown), so as to rotatably support the vehicle wheel hub and brake rotor 10 relative thereto.

Figure 5:
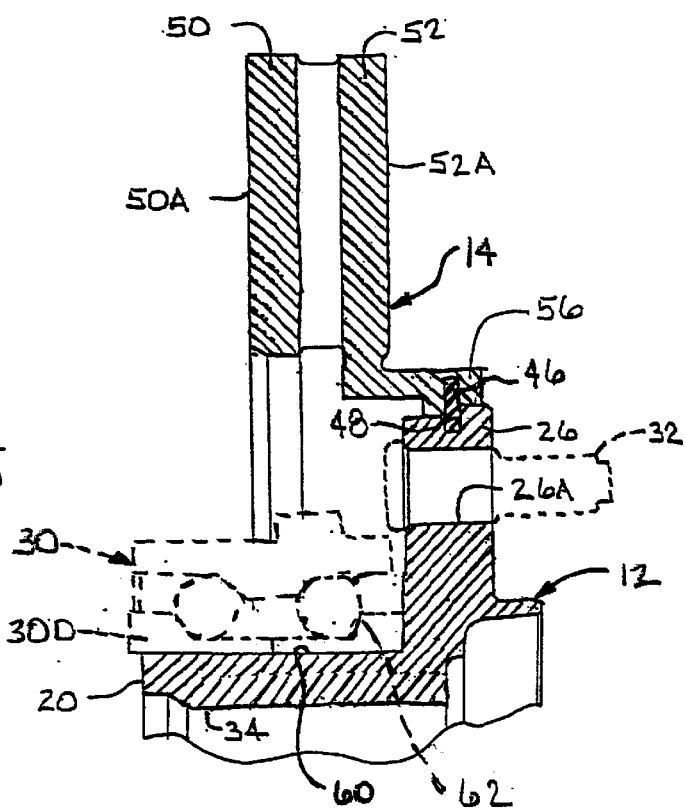
FIG. 5 is a sectional view of a portion of a third embodiment of a vehicle wheel hub and brake rotor in accordance with the present invention.

Alternatively, the bearing unit 30 can be other than illustrated if so desired. For example, bearing unit can include tapered bearings (not shown), and can include an inner race which is disposed on the outer surface 28 of the wheel hub portion 12. In the latter design, the wheel hub portion 12 would not define an inner race for the outboard bearings 30B of the bearing unit 30 as illustrated in the embodiment shown in FIG. 1, but would define a surface 60 for receiving an inner race portion 62 of the associated bearing unit (as shown in FIG. 5).

Figure 3:
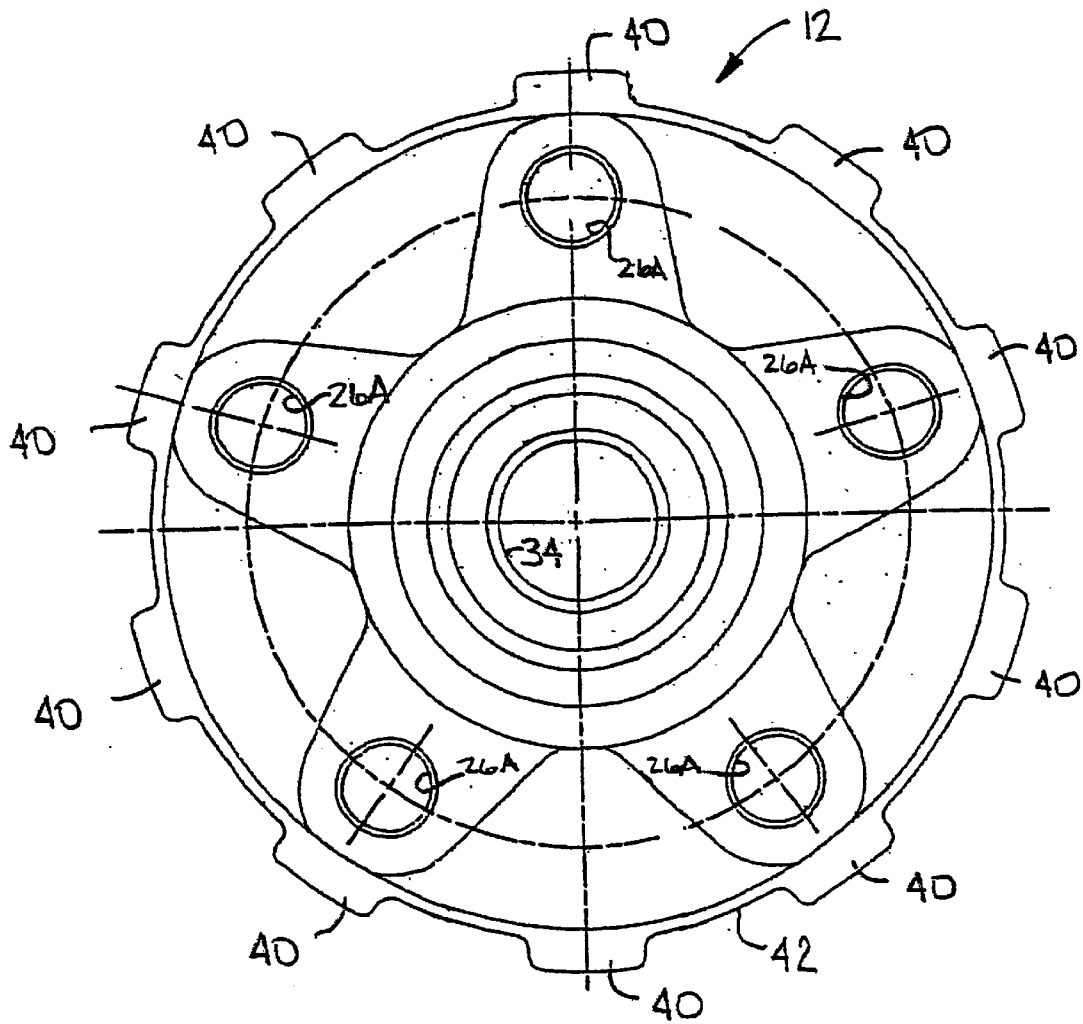
FIG. 3 is a side plan view of the wheel hub portion in the direction of line 3—3 of FIG. 2.

The flange 26 of the wheel hub portion 12 includes a plurality of circumferentially spaced wheel stud receiving holes 26A formed therein (five of such wheel stud receiving holes 26A illustrated in FIG. 3). A lug bolt 32 (shown in phantom in FIG. 1) is disposed in each of the wheel stud receiving holes 26A to secure a vehicle wheel (not shown) to the vehicle wheel hub and brake disc 10 for rotation therewith. The opened outboard end 22 of the wheel hub portion 12 is adapted to receive a nut (not shown) which is installed on a threaded end of a shaft to secure and load the bearing unit 30 in a known manner. Alternatively, in the case of a non-driven wheel hub, a dust cover or other suitable protective cover (not shown) can be installed on the opened outboard end 22 to prevent dirt, mud, water, and other debris from entering into the interior of the wheel hub portion 12 therethrough. Alternatively, other methods can be used to secure and load the bearing unit 30. For example, the end 20 of the wheel hub portion 12 can be deformed over the race of the bearing unit 30 (as shown in phantom at 20' in FIG. 1) during a metal forming process.

The wheel hub portion 12 is provided with a bore 34 extending therethrough from the opened inboard end 20 to the opened outboard end 22. In the illustrated embodiment, the bore 34 includes internal splines 36 provided along a portion thereof. The internal splines 36 of the wheel hub portion 12 are adapted to matingly receive external splines provided on an outer surface of an associated drive member, such as for example, an axle shaft or drive shaft (not shown). Alternatively, the structure of the wheel hub portion 12 can be other than illustrated if so desired. For example, the wheel hub portion 12 can be of a solid design (i.e., no inner bore) and/or can have the bore 34 but not include the internal splines 36 (as shown in FIG. 5).

Figure 2:
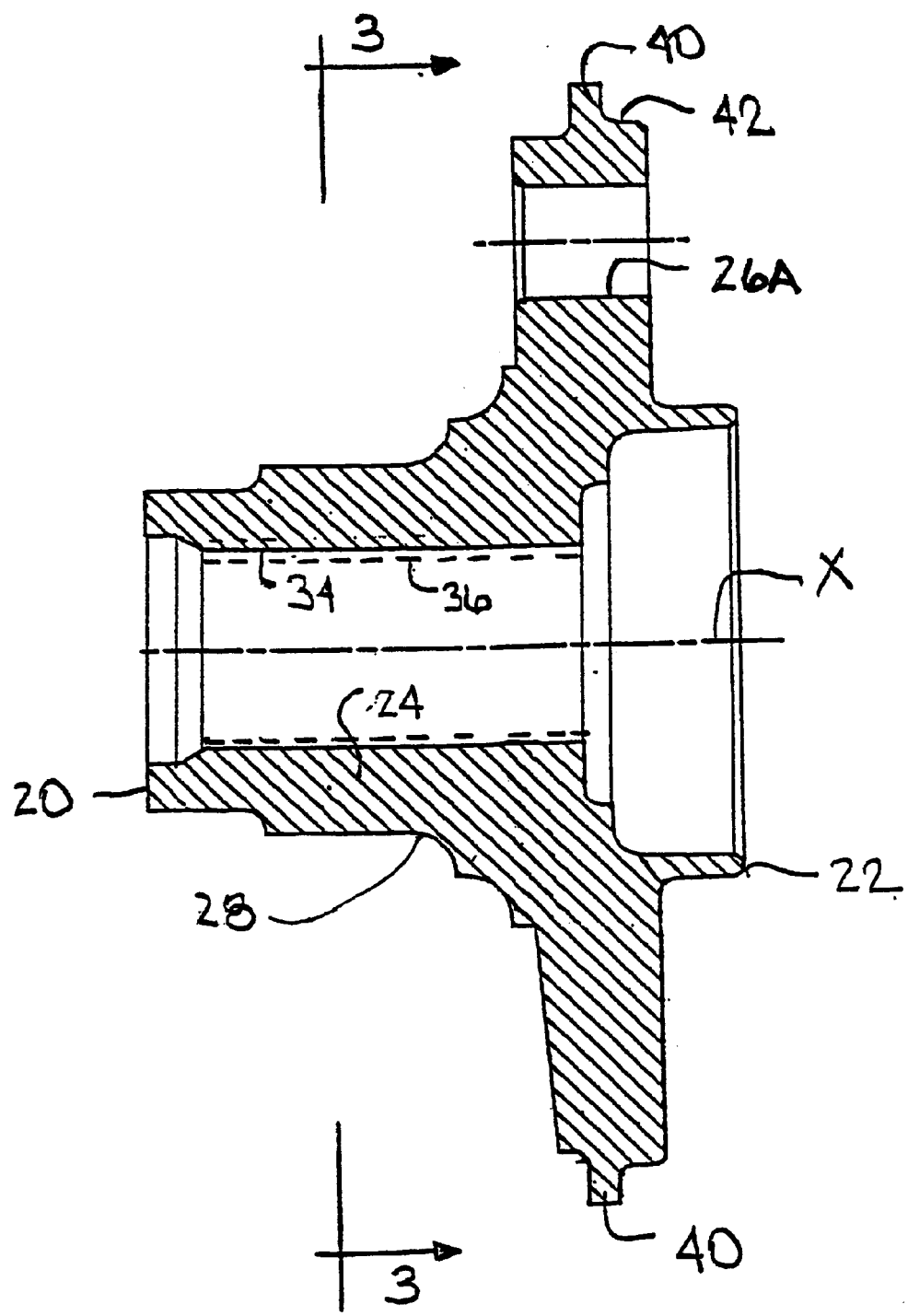
FIG. 2 is a sectional view of the wheel hub portion of the wheel hub and brake rotor illustrated in FIG. 1.

As shown in FIGS. 1 and 2, the flange 26 of the wheel hub portion 12 is provided with a plurality of outwardly extending tabs or protuberances 40 spaced circumferentially around an outer surface 42 thereof (ten of such tabs 40 illustrated in FIG. 3). In the illustrated embodiment, each of the tabs 40 is located generally intermediate the outer surface 42 in approximately the center thereof. Alternatively, the spacing, configuration and/or location of the tabs 40 can be other than illustrated if so desired. As will be discussed below, the tabs 40 are operative to join the wheel hub portion 12 and the brake disc portion 14 together during the manufacture of the vehicle wheel hub and brake rotor 10. Also, other means can be used to join the wheel hub portion 12 and the brake disc portion 14 together. For example, as shown in FIG. 4, the outer surface 42 of the wheel hub portion 12 can be provided with a plurality of recesses 44 (only one of such recesses 44 are shown in FIG. 4), that would be filled with material of the brake rotor portion 14 during the casting of the brake rotor, or as shown in FIG. 5, a pin-link member 46 could be inserted into corresponding apertures 48 formed in the hub flange 26 so that during the casting of the brake rotor 14, the pin members 46 are effective to join the wheel hub portion 12 and the brake rotor portion 14 together.

The brake rotor 14 is preferably formed from a castable material, such as for example, iron, aluminum or alloys thereof. As will be discussed below, the brake rotor 14 is joined to the wheel hub portion 12 during a casting process. As shown in this embodiment, the brake rotor portion 14 of the vehicle wheel hub and brake rotor 10 is a vented type of brake rotor and includes a pair of brake friction plates 50 and 52.

The brake friction plates 50 and 52 are spaced apart and connected together by fins or ribs 54. The brake friction plate 50 defines an inboard brake friction plate and includes an outer surface 50A. The brake friction plate 52 defines an outboard brake friction plate and includes an outer surface 52A, which is generally parallel to the outer surface 50A. The brake friction plate 52 includes a flange or transition portion 56 which is operative to connect the brake friction plate 52, and therefore the brake friction plate 50, to the flange 26 of the wheel hub portion 12. In the illustrated embodiment, the flange 56 is a generally radially inwardly extending flange; however, the flange 56 can be other than illustrated if so desired. Also, the structure of the brake rotor 14 can be other than illustrated if so desired.

One advantage of the vehicle wheel hub and brake rotor 10 of the present invention is that the wheel hub portion 12 can be made of a material which is sufficiently strong to form the splines 36 in a driven wheel application and/or to support vehicle loads.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle wheel hub, brake rotor and bearing unit comprising:
    a wheel hub portion formed from a first material and including a main body having an inboard end and an outboard end, said main body provided with a radially outwardly extending wheel hub flange and defining a bearing surface adapted to support at least a portion of a bearing unit, said wheel hub flange provided with a plurality of circumferentially spaced wheel stud receiving holes formed therein and adapted to receive lug bolts to secure a vehicle wheel to said vehicle wheel hub and brake rotor for rotation therewith;
    a bearing unit carried by said bearing surface of said wheel hub portion; and
    a brake rotor portion formed from a second different material and including an outer friction ring and a brake rotor flange, said brake rotor flange being joined to said wheel hub flange during an in situ casting process thereof to thereby join said wheel hub portion to said brake rotor portion.

2. The vehicle wheel hub, brake rotor and bearing unit defined in claim 1 wherein said wheel hub flange is provided with a plurality of outwardly extending tabs which are cast into said brake rotor portion during the casting process to join said wheel hub portion to said brake rotor portion.

3. The vehicle wheel hub, brake rotor and bearing unit defined in claim 1 wherein said wheel hub flange is provided with a plurality of recesses which are filled with material of said brake rotor portion during the casting process to join said wheel hub portion to said brake rotor portion.

4. The vehicle wheel hub, brake rotor and bearing unit defined in claim 1 wherein said wheel hub flange is provided with a plurality of recesses for receiving a pin-link member so that during the casting process of said brake rotor portion, said pin members are effective to join said wheel hub portion and said brake rotor portion together.

5. The vehicle wheel hub, brake rotor and bearing unit defined in claim 1 wherein said wheel hub flange is formed from steel and said brake rotor portion is formed from cast iron.

6. The vehicle wheel hub, brake rotor and bearing unit defined in claim 1 wherein said wheel hub flange is formed from steel and said brake rotor portion is formed from aluminum.

7. The vehicle wheel hub, brake rotor and bearing unit defined in claim 1 wherein said wheel hub flange is formed from ductile iron and said brake rotor portion is formed from cast iron.

8. The vehicle wheel hub, brake rotor and bearing unit defined in claim 1 wherein said main body of said wheel hub portion defines an inner race for at least a portion of the bearing unit.

9. The vehicle wheel hub, brake rotor and bearing unit defined in claim 1 wherein said bearing unit is an internal ring rotation type of bearing unit.

10. The vehicle wheel hub, brake rotor and bearing unit defined in claim 1 wherein said main body of said wheel hub portion includes a bore formed therethrough, said bore provided with internal splines which are adapted to matingly receive external splines provided on an outer surface of an associated drive member.

11. The vehicle wheel hub, brake rotor and bearing unit defined in claim 1 wherein said bearing unit is an internal ring rotation type of bearing unit carried by said bearing surface of said wheel hub portion, said bearing unit including an outer race fixedly secured to a non-rotating vehicle component, said bearing unit adapted to rotatably support said vehicle wheel hub and brake rotor relative to said outer race, said main body of said wheel hub portion further including a bore formed therethrough and provided with internal splines which are adapted to matingly receive external splines provided on an outer surface of an associated drive member.

12. A method for producing a vehicle wheel hub, brake rotor and bearing unit comprising the steps of:

(a) providing wheel hub portion formed from a first material and including a main body having an inboard end and an outboard end, the main body provided with a radially outwardly extending wheel hub flange and defining a bearing surface adapted to support at least a portion of a bearing unit, the wheel hub flange provided with a plurality of circumferentially spaced wheel stud receiving holes formed therein and adapted to receive lug bolts to secure a vehicle wheel to the vehicle wheel hub and brake rotor for rotation therewith;

(b) placing the wheel hub portion in a mold;

(c) casting a brake rotor portion formed from a second different material in situ therewith, the brake rotor portion including an outer friction ring and a brake rotor flange which is operatively joined to the wheel hub flange during the in situ casting process to thereby join the wheel hub portion to the brake rotor portion; and (d) providing a bearing unit which is carried by the bearing surface of the wheel hub portion.

13. The method defined in claim 12 wherein the wheel hub flange is provided with a plurality of outwardly extending tabs which are cast into the brake rotor portion during the in situ casting process.

14. The method defined in claim 12 wherein the wheel hub flange is provided with a plurality of recesses which are filled with material of the brake rotor portion during the in situ casting process to join the wheel hub portion to he brake rotor portion.

15. The method defined in claim 12 wherein the wheel hub flange is provided with a plurality of recesses for receiving a pin-link member so that during the in situ casting process the pin members are effective to join the wheel hub portion and the brake rotor portion together.

16. The method defined in claim 12 wherein the wheel hub flange is formed from steel and the brake rotor portion is formed from cast iron.

17. The method defined in claim 12 wherein the wheel hub flange is formed from ductile iron and the brake rotor portion is formed from cast iron.

18. The method defined in claim 12 wherein the wheel hub portion includes a bore formed therethrough and provided with internal splines which are adapted to matingly receive external splines provided on an outer surface of an associated drive member.

* * * * *